June 26, 1962 — W. A. KATES — 3,040,759
RATIO REGULATOR
Filed Oct. 29, 1958 — 2 Sheets-Sheet 1
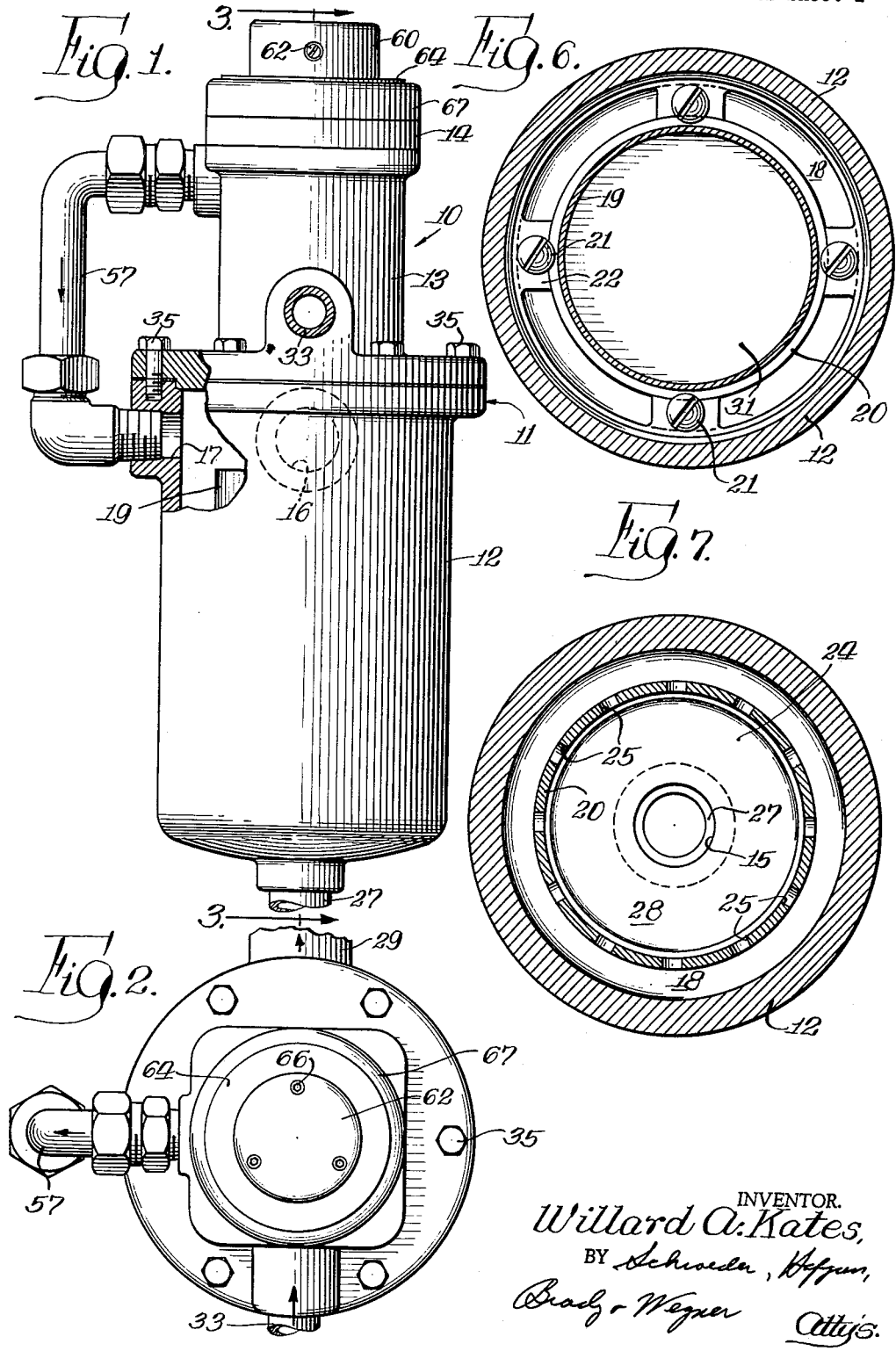
INVENTOR.
Willard A. Kates,
BY Schroeder, Hofgren,
Brady & Wegner
Atty's.

June 26, 1962 W. A. KATES 3,040,759
RATIO REGULATOR
Filed Oct. 29, 1958 2 Sheets-Sheet 2
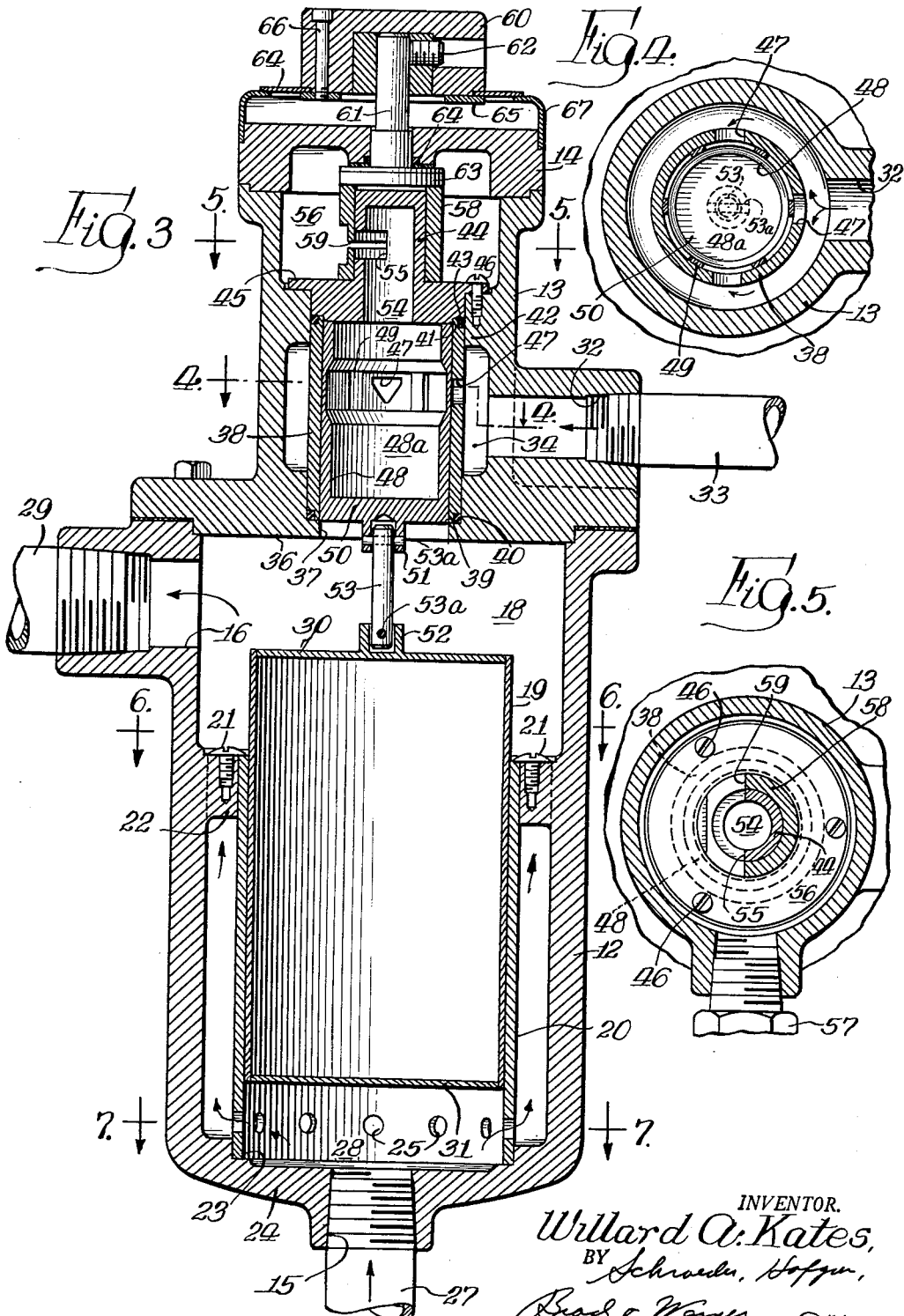
INVENTOR.
Willard A. Kates
BY Schroeder, Hofgren,
Brady & Wegner
Atty's

United States Patent Office 3,040,759
Patented June 26, 1962

3,040,759
RATIO REGULATOR
Willard A. Kates, Deerfield, Ill., assignor to The W. A. Kates Co., a corporation of Illinois
Filed Oct. 29, 1958, Ser. No. 770,434
8 Claims. (Cl. 137—111)

This invention relates to a fluid regulator and in particular to a regulator for maintaining a desired proportioning of two or more fluids.

A known method of blending a plurality of fluids in a preselected ratio is to pass the fluids through a regulator which maintains the flow of each fluid to a mixing chamber in the desired ratio. It is a general object of the present invention to produce a new and improved regulator of the character described.

It is a more specific object of the invention to produce a regulator wherein the preselected ratio is maintained by automatic restoration of a force balance by the force momentarily destroying the balance.

Another object of the invention is the provision of such a regulator utilizing a pair of opposed displaceable members such as impellers or pistons arranged to be balanced only when a preselected ratio of pressures of the plurality of fluids controlled thereby is established.

A further object is to provide such a regulator wherein the different displaceable members have different pressure responsive areas correlated with the relative values of the desired rates of proportioning.

Still another object is to provide such a regulator wherein inter-face mixing of the different fluids is substantially precluded.

A yet further object of the invention is to provide such a regulator wherein an adjustable orifice is provided to effect the desired ratio of the blend, which orifice is arranged to be independent of the displaceable member structure.

Other features and advantages of the invention will be apparent from the following description, taken in connection with the accompanying drawing wherein:

FIG. 1 is an elevation of a regulator embodying the invention;

FIG. 2 is a plan view thereof;

FIG. 3 is a diametric section thereof taken approximately along the line 3—3 of FIG. 1;

FIG. 4 is a horizontal transverse section thereof taken approximately along the line 4—4 of FIG. 3;

FIG. 5 is a horizontal transverse section thereof taken approximately along the line 5—5 of FIG. 3;

FIG. 6 is a horizontal transverse section thereof taken approximately along the line 6—6 of FIG. 3; and FIG. 7 is a horizontal transverse section thereof taken approximately along the line 7—7 of FIG. 3.

Referring now to the drawing, a regulator 10 is shown to comprise a casing 11 having a lower upwardly opening cup-shaped portion 12, a tubular mid-portion 13, and a cap portion 14. At its lower end, lower portion 12 is provided with an inlet opening 15 and at its upper end, the lower portion is provided with an outlet opening 16 and a second inlet opening 17. Lower portion 12 defines an internal chamber 18 in which is received a first displaceable member 19 comprising a float-impeller vertically reciprocable in a tubular guide 20. Guide 20 is secured coaxially of chamber 18 by a plurality of screws 21 inwardly overhanging the upper end of the guide and retained in a corresponding plurality of radially inwardly extending lugs 22 on the casing portion 12. The lower end 23 of the guide is urged sealingly against a transverse bottom wall 24 of casing portion 12, whereby the guide defines a radially enlarged tubular extension of the inlet opening 15 within chamber 18. Slightly above lower end 23, guide 20 is provided with a plurality of circumferentially spaced orifices 25. Inlet opening 15 is arranged for threaded connection thereto of a conduit 27. Fluid flowing through conduit 27 is discharged to the space 28 within guide 20 and below float-impeller 19, from which space it flows through orifices 25 into chamber 18. From chamber 18, fluids pass outwardly through outlet opening 16 and a suitable conduit 29 connected thereto. As the fluid flows through orifices 25, the pressure thereof is reduced so that the pressure of the fluid acting downwardly on the top end wall 30 of the float-impeller is less than the pressure of the fluid acting upwardly on the bottom end wall 31 of the float-impeller. This pressure differential effects an upward urging of the float-impeller.

Mid-portion 13 of casing 11 is provided, at its lower end, with an inlet opening 32 to which may be sealingly secured a suitable conduit 33 for delivering a second stream of fluid through inlet opening 32 to a lower chamber 34 within casing mid-portion 13. The lower end of the mid-portion 13 is sealingly secured to the upper end of the casing lower portion 12 by suitable means such as screws 35 and the lower transverse end portion 36 of the casing mid-portion is provided centrally with a stepped opening 37 communicating with the top of chamber 18. A tubular guide 38 extends vertically through chamber 34 and has a lower end 39 sealed to lower transverse portion 36 of the casing mid-portion by an annular sealing ring 40, and an upper end 41 sealingly secured to an annular inturned flange portion 42 of the casing mid-portion by a corresponding sealing ring 43. Guide 38 is secured in this position by a top piece 44 having a radially outturned flange 45 secured against the top of flange 42 by a plurality of screws 46.

Approximately midway vertically of chamber 34, guide 38 is provided with a plurality of circumferentially spaced valve openings 47 which are wedge-shaped narrowing downwardly. Slidably longitudinally through guide 38 is a second displaceable member 48 comprising a piston-impeller. The piston-impeller is provided with a plurality of ports 49 which permit the second stream of fluid to pass from inlet 32 through valve openings 47, and through the ports to the interior space 48a of the piston-impeller. The piston-impeller comprises an upwardly opening cup-shaped member having a transverse bottom portion 50 against which the pressure of the second stream of fluid in space 48a may act to urge the piston-impeller downwardly. Bottom portion 50 is provided with a depending annular boss 51 and top end wall 30 of the float impeller 19 is provided with a corresponding upstanding annular boss 52. A connecting link 53 is secured at its upper end to depending boss 51 and at its lower end to upstanding boss 52 by suitable pins 53a to connect the float-impeller to the piston-impeller.

The second stream of fluid is directed from space 48a upwardly through a communicating recess 54 in top piece 44, and then outwardly through a circumferentially extending slot 55 in the top piece to an annular chamber 56 defined by cap 14 and the upper portion of casing mid-portion 13. From chamber 56, the second stream of fluid is delivered through a conduit 57, through inlet opening 17 in casing lower portion 12 to chamber 18. The amount of opening of slot 55 to chamber 56 is controlled by a concentrically surrounding sleeve 58 having a slot 59 in longitudinal registration with slot 55. Slot 55 extends substantially 180° circumferentially of top piece 44 and more or less of the slot is exposed to chamber 56 depending on the rotational position of slot 59 of the sleeve. Thus, in effect, slots 55—59 comprise an adjustable orifice controlled by the position of sleeve 58.

The position of sleeve 58 is manually controlled by a knob 60 secured to a shaft 61 by suitable means such as a set screw 62 and extending inwardly through cap 14. A connector 63 secures the inner end of the shaft to sleeve 58. A suitable annular seal 64 is provided between shaft 61 and cap 14 to prevent leakage of fluid from chamber 56 along the shaft.

The adjustment of sleeve 58 is indicated by a dial 64 secured to the underside of knob 60 by a clamp ring 65 and suitable retaining means such as screws 66. An annular cover 67 is fixed to the top of cap 14 and may be marked suitably for co-operation with dial 64 to indicate the position of the knob and, correspondingly, the sleeve 58. The operation of regulator 10 is as follows. A first stream of fluid is delivered from conduit 27 to space 28. This will lift the float-impeller 19 to a position uncovering completely the ports 25 and fluid will flow through orifices 25 to chamber 18. This stream comprises the main or uncontrolled stream of fluid. A second stream of fluid is delivered from a conduit 33, through valve openings 47 of guide 38, through ports 49 of piston-impeller 48, through the space 48a in the piston-impeller 48 and communicating recess 54 of top piece 44, through the adjustable orifice defined by slots 55—59, and from chamber 56 through conduit 57 to chamber 18.

The desired ratio of the volume rate of flow of the two streams of fluid delivered to chamber 18 is determined by the size of the adjustable orifice defined by slots 55—59 and is controlled by knob 60. Once the operator sets this ratio, the regulator 10 automatically maintains the ratio notwithstanding a variation in the pressure conditions of the two streams as delivered to the regulator through conduits 27 and 33 respectively. More specifically, float-impeller 19 is urged vertically by a pressure differential between the pressure of the first stream of fluid in space 28 and the mixed fluids in chamber 18. Piston-impeller 48 is urged vertically downwardly by the pressure of the second stream of fluid within space 48a and the mixed fluids in chamber 18 acting on the area of top wall not directly below the bottom portion 50 of the piston-impeller 48. As the float-impeller 19 and piston-impeller 48 are connected directly by link 53, they will be held against vertical movement when the force acting upwardly on bottom end wall 31 of the float-impeller is exactly equal to the force in the chamber 48a acting downwardly on the bottom portion 50 of the piston-impeller plus the downward force on that part of the top 30 not directly beneath piston 50. The piston-impeller controls the valve opening 47 so that increasingly freer communication is had between inlet opening 32 and space 48a when the piston-impeller and float-impeller connected thereto move upwardly, and more restricted communication is had therebetween when the piston-impeller and connected float-impeller move downwardly.

Assuming that a pressure condition obtains wherein the upwardly acting force of the first stream of fluid on bottom end wall 31 is balanced by the downwardly acting force of the second stream of fluid on the bottom portion 50 and the above-described portion of the top 30 (the weight of the piston-impeller and float-impeller devices is preferably counterbalanced by the buoyancy of float-impeller 19), a change in the conditions of either of the streams of fluids acts as follows. Should the pressure of the first stream of fluid increase in space 28 or the pressure of the second stream of fluid decrease in space 48a, the piston-impeller 48 is urged upwardly. This causes ports 49 of the piston-impeller to uncover a larger area of valve openings 47 and permit a greater flow of the second stream of fluid into space 48a until the forces acting on the impellers are again balanced as described above. Thus, the regulator will be balanced at a new vertical position of the float-impeller and piston-impeller, and the rate of flow of the second stream of fluid will be readjusted to maintain the flow rate ratio determined by the adjustable orifice means 55—59. Alternatively, should the pressure of the first stream of fluid within space 28 decrease or the pressure of the second stream of fluid within space 48a increase, the piston-impeller 48 will be urged downwardly, thereby closing more fully the valve openings 47 and decreasing the flow of the second stream of fluid to space 48a. The impellers, thusly, are vertically repositioned to re-establish the desired ratio of fluid flow of the two streams of fluid to chamber 18. If, at any time, it is desired to readjust the selected ratio, knob 60 need merely be rotated to readjust the size of the adjustable orifice 55—59 as indicated to the operator by dial 64.

Thus, float impeller 19 and piston-impeller 48 of regulator 10 are constantly balanced during the operation of the device. Any change in the pressure conditions (which would thereby cause a variation in the flow conditions of the two streams of fluid) is immediately compensated by an adjustment of the vertical position of the piston-impeller to vary the effective size of valve openings 47 to adjust thereby the rate of flow of the second stream of fluid and restore the balanced condition. As two different impeller devices are utilized, they may have different force responsive cross sectional areas, as shown, permitting a relatively small second stream of fluid to be properly mixed with a relatively large first stream of fluid. As the two streams of fluid are mixed in chamber 18, any leakage of the individual streams around the respective impellers merely effects a self-cleaning of the impellers and interface mixing of the leakage fluids is precluded. As the adjustable orifice means 55—59 is completely independent of the valve control effected by the piston-impeller, it may be designed independently of the impeller structure for maximum efficiency and accuracy in operation.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A regulator for blending a plurality of streams of fluids in a preselected ratio, comprising: housing means defining a mixing chamber having a discharge outlet, a first inlet to the mixing chamber, a control chamber, and a second inlet to the control chamber; a first displaceable member in the mixing chamber having a portion urged against a fluid pressure in said chamber by the force of one stream of fluid entering said mixing chamber through said first inlet; orifice means downstream of said first displaceable member delivering said one stream from said inlet to said mixing chamber at a reduced pressure; a second displaceable member in said control chamber having a portion urged against the fluid pressure in said mixing chamber by the force of a second stream of fluid entering said control chamber through said second inlet; means defining a passage from said control chamber to said mixing passage; valve means controlled by said second displaceable member to cause the rate of flow of the second stream to said passage to be proportional to the position of said second displaceable member; orifice means downstream of said valve means for delivering said second stream to said passage at a reduced pressure, at least one of said orifice means being adjustable; and means connecting said displaceable members for corresponding movement whereby a change in the pressure of either or both streams in said chambers causes a corresponding change in the arrangement of the valve means to adjust the rate of flow of the second stream to maintain a ratio of flow of said streams as determined by the setting of the adjustable orifice means.

2. The regulator of claim 1 wherein float means are associated with at least one of the displaceable members to counterbalance the weight thereof.

3. The regulator of claim 1 wherein the adjustable orifice means is manually adjustable to provide a preselected ratio of the rates of flow of said streams.

4. The regulator of claim 1 wherein the areas of the portions of the displaceable members confronting the chambers are different.

5. The regulator of claim 1 wherein the first displaceable member is disposed below the second displaceable member and said mixing chamber is disposed therebetween.

6. The regulator of claim 5 wherein the means connecting the displaceable members comprises a link extending through said mixing chamber.

7. The regulator of claim 1 wherein the valve means is disposed upstream of the second displaceable member.

8. A regulator for blending a plurality of streams of fluids in a preselected ratio, comprising: housing means defining a mixing chamber; means for delivering a first fluid to the mixing chamber including an inlet means and a first pressure dropping orifice; means for delivering at least one additional fluid to the chamber including an additional inlet means, an additional pressure dropping, adjustable orifice, means defining a flow passage between said additional inlet means and the chamber, and a valve means for each such additional fluid; first impeller means having the first fluid acting thereagainst on opposite sides of the first orifice; additional impeller means having the additional fluids acting thereagainst on opposite sides of each additional orifice; and means associated with the impeller means for controlling the valve means to maintain a balance of the fluid pressure forces acting on each impeller against the fluid pressure in the chamber.

References Cited in the file of this patent

UNITED STATES PATENTS

| | | |
|---|---|---|
| 868,680 | Martin | Oct. 22, 1907 |
| 1,619,948 | Mangiameli | Mar. 8, 1927 |
| 1,842,825 | Cunningham | Jan. 26, 1932 |
| 2,052,022 | Fisher | Aug. 25, 1936 |
| 2,842,399 | Strahman | July 8, 1958 |
| 2,912,994 | Mori | Nov. 17, 1959 |